March 18, 1941.   A. M. WALSTROM   2,235,270
MACHINE FOR MAKING TUBS AND THE LIKE
Filed Sept. 29, 1938   3 Sheets-Sheet 1

INVENTOR
AXEL M. WALSTROM
BY Hewitt G. Dixon
ATTORNEY

March 18, 1941.  A. M. WALSTROM  2,235,270
MACHINE FOR MAKING TUBS AND THE LIKE
Filed Sept. 29, 1938    3 Sheets-Sheet 3

INVENTOR
AXEL M. WALSTROM
ATTORNEY

Patented Mar. 18, 1941

2,235,270

UNITED STATES PATENT OFFICE 2,235,270

MACHINE FOR MAKING TUBS AND THE LIKE

Axel M. Walstrom, Minneapolis, Minn., assignor to The Creamery Package Mfg. Company, Chicago, Ill., a corporation of Illinois Application September 29, 1938, Serial No. 232,293

2 Claims. (Cl. 147—19)

The invention relates to machinery for the manufacture of tubs and like containers of stave construction, and more particularly to a machine for automatically trimming to uniform length and crozing the staves before assembly.

In the coopering of butter tubs and similar containers, it is common practice to assemble in heavy truss hoops the requisite staves for a tub, the staves having been jointed previously but not otherwise finished. The trussed stave assemblies are then trimmed at both ends and crozed for the bottoms upon specially adapted lathes, requiring the manual handling of the heavy assemblies to and from the lathe spindles and manual manipulation of the cutting tools.

The principal object of this invention is to provide an automatic machine for accurately trimming and crozing a continuous series of jointed loose staves, without using truss rings and with great saving of time and labor. Further objects include the provision of automatic mechanisms in such a machine for securing the tapered staves, while passing through the zone of cutting operations, in precisely similar inter-relation to that in which they are subsequently assembled in a tub, so that the staves are trimmed and crozed alike at right angles to the medial line of each stave.

Other objects and advantages will be apparent in the following detailed description of a preferred embodiment of the invention which I have selected for illustration in the accompanying drawings. It will be understood, however, that various changes in form, construction and arrangement may be made by those skilled in the art if said changes do not depart from the spirit and scope of the invention as expressed in the appended claims.

Figure 1:
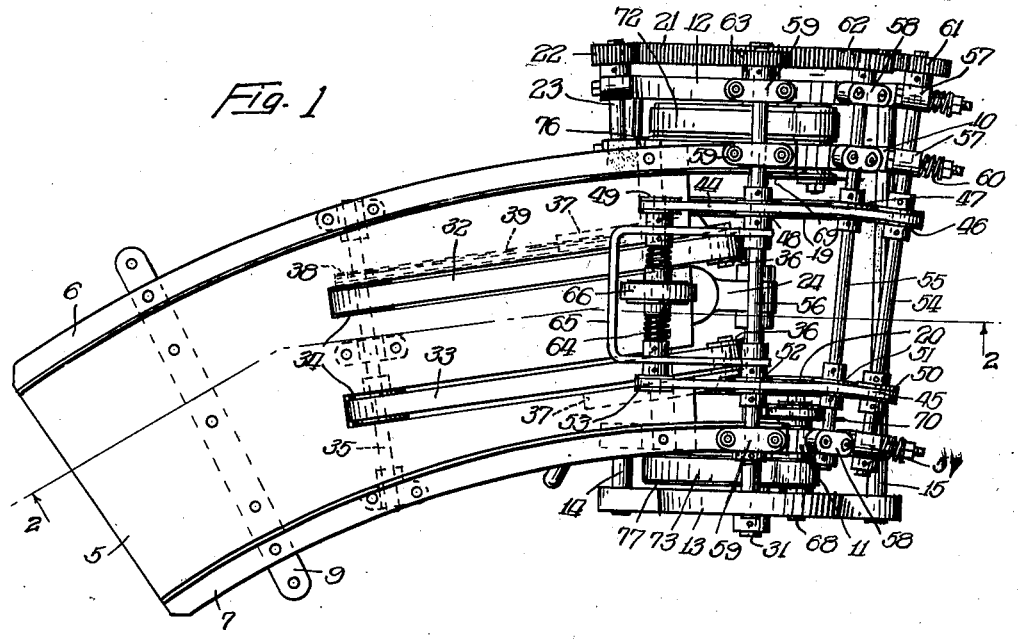
Figure 2:
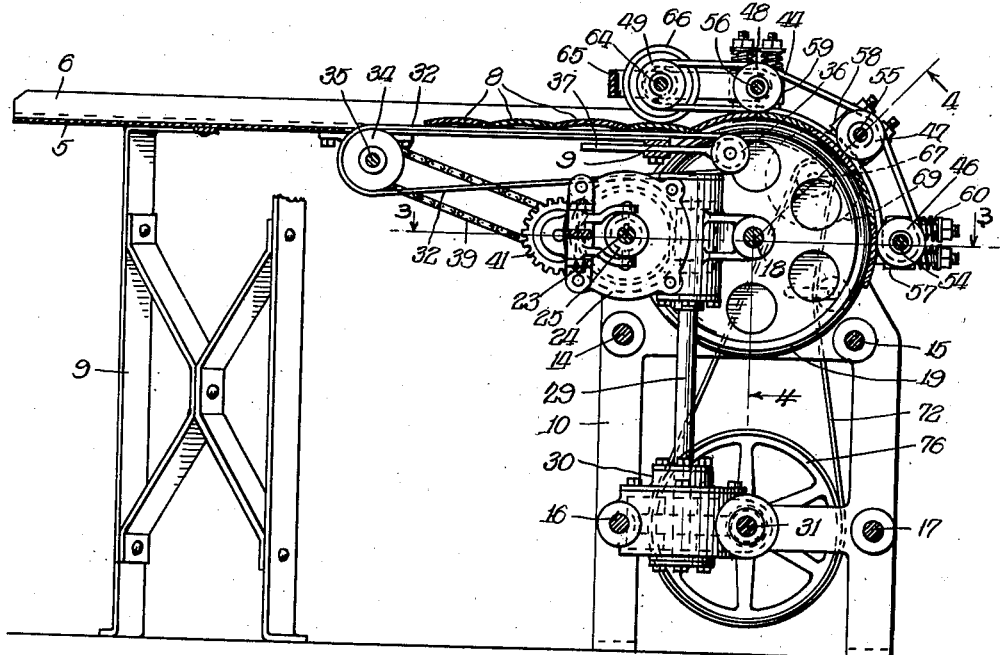
Figure 3:
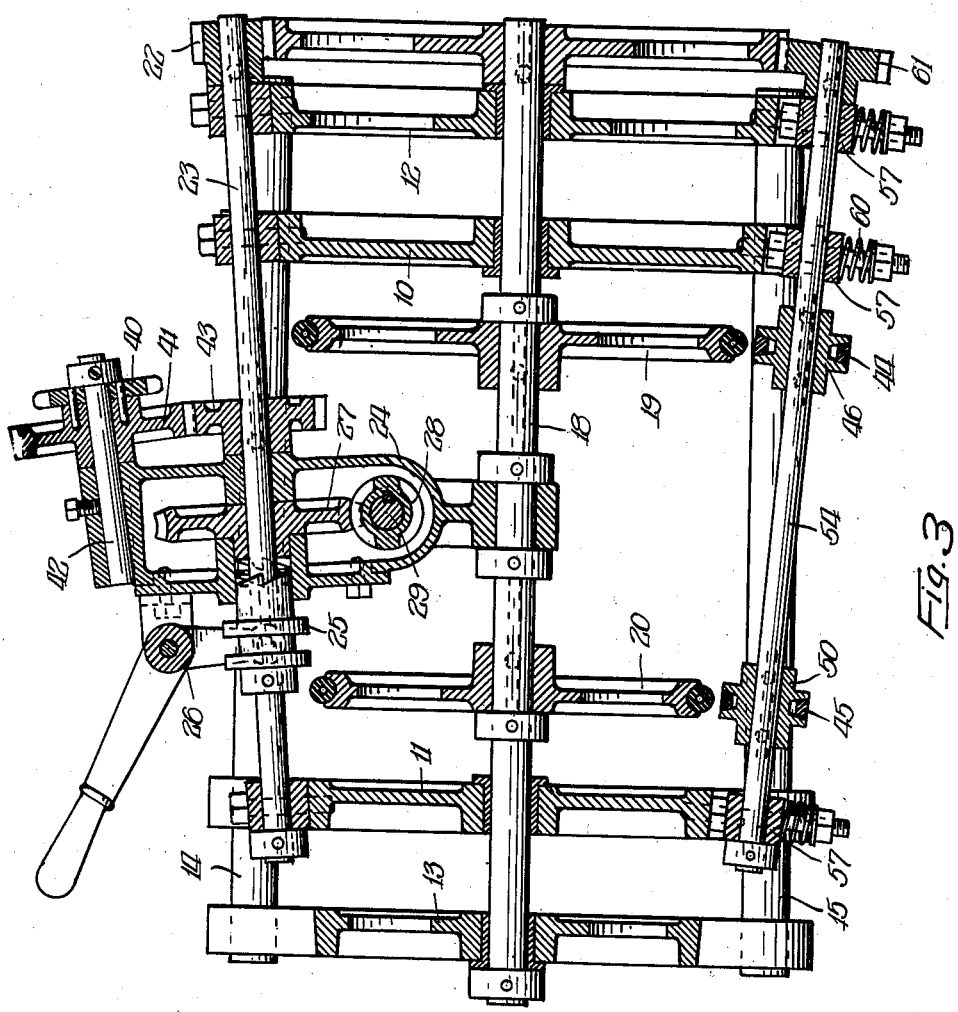
Figure 4:
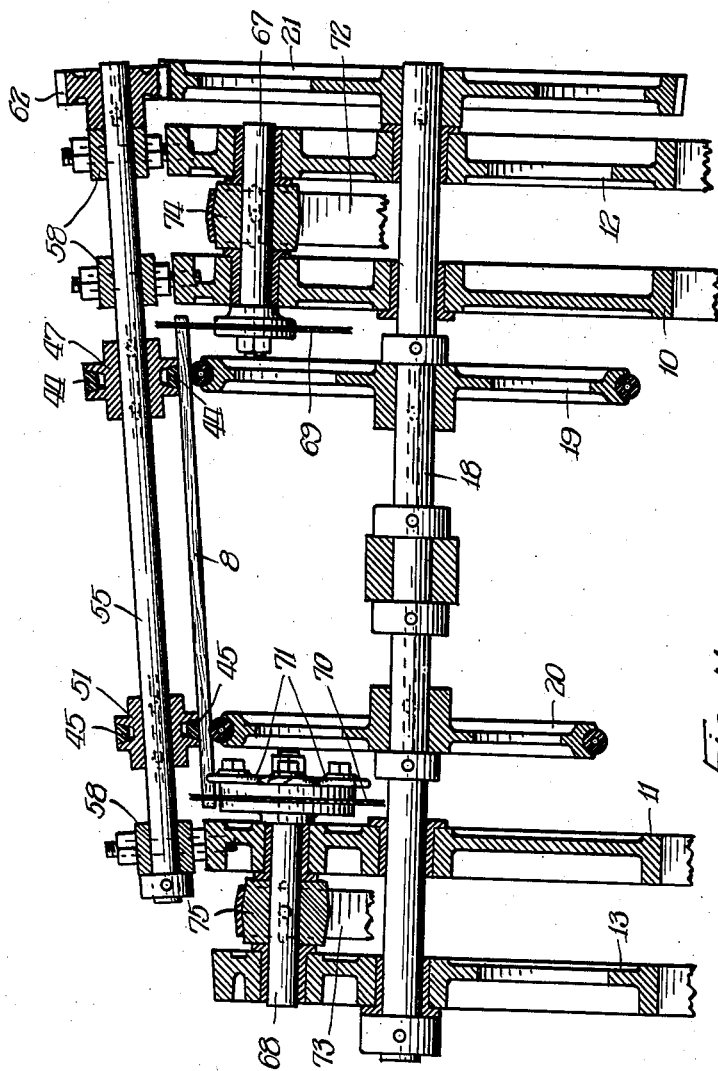

Referring to the drawings, Fig. 1 represents a plan view of the machine. Fig. 2 is a sectional view in elevation taken on the planes of the line 2—2 in Fig. 1. Fig. 3 is a partial plan view in section taken on the plane of the line 3—3 in Fig. 2. Fig. 4 is a partial sectional elevation taken on the plane of the line 4—4 in Fig. 2.

Generally stated, the operative arrangement of the machine, as herein illustrated, comprises a table upon which an operator lays previously jointed staves in laterally abutting relation and pushes them onto conveyor belts which carry them to a pair of revolving wheels having diameters equivalent to the inside of a finished tub. The staves are received upon the peripheries of these wheels in the same relation as when assembled in a tub, and are supported thereon by overlying belts, the staves first having been crowded into close lateral abutment by an over-speed friction wheel bearing upon the upper surfaces of the approaching staves. As the staves advance upon the revolving wheels, they are carried into contact with a pair of circular saws which trim the respective ends of the staves, and also into contact with a revolving cutter which forms the croze in the staves. Thereafter the staves are released from the wheels and securing belts, and fall upon some convenient receptacle.

More specifically described, with reference to the drawings, a horizontal table or lay-out board 5 is formed with curved lateral edges along which are secured curved guide rails 6 and 7. The board 5 is adapted to receive a series of tapered jointed staves 8 laid edge to edge and retained between the rails 6 and 7. One end of the board 5 is supported upon a standard 9, the other end being supported by the extended ends of the guide rails 6 and 7 secured to a spaced pair of upright frame members 10 and 11. Positioned outwardly of the members 10 and 11, and spaced therefrom, are another pair of frame members 12 and 13. The four frame members are rigidly connected by cross frame bars 14, 15, 16 and 17, forming a structure upon which is mounted the operating devices hereinafter described.

The upright frame members 10 to 13 have semi-circular upper end portions varying in radius from a common horizontal axis to form across their peripheries a semi-conical surface having the same angular relation to its axis as that of the assembled staves in a finished tub. A shaft 18, positioned in axial relation to the semi-circular end portions of the members 10 to 13 is operatively supported in suitable bearings provided in those members. A pair of rubber-tired wheels 19 and 20 are rigidly mounted on the shaft 18, the wheels being spaced from each other and positioned between the frame members 10 and 11. The wheels 19 and 20 are adapted to receive the staves 8 from the table 5 and support them for revolution upon the friction inducing peripheries of the wheels, the latter having respective diameters equal to the inside diameters of a finished tub at similar locations.

A gear 21, secured on one extended end of the shaft 18, drives the latter and the wheels 19 and 20. The gear 21 is driven by a pinion 22 secured on a shaft 23 operable in suitable bearings provided on the frame members 10, 11 and 12. A conventional worm and gear drive is housed in a casing 24 which latter has free bearing support upon the shafts 18 and 23. Shaft 23 carries a splined clutch collar 25 manually engageable, by means of a hand lever and shifting yoke 26, with the hub of a gear 27 housed in the casing 24 and having free bearing on shaft 23. Gear 27 is in driven engagement with a worm 28 secured on a shaft 29, which latter extends into and is driven by the gear in another conventional worm and gear drive housed in the casing 30 mounted at one side on the frame cross bar 16 and having free bearing support on the other side upon a shaft 31. Shaft 31 is the worm shaft in the worm and gear drive unit 30, and is rotatably mounted in suitable bearings provided on the frame members 10 to 13. While not shown in the drawings, shaft 31 is conventionally connected with a source of power for operation of the machine.

A pair of belt conveyors 32 and 33 operate within slots provided in the table 5 to advance continuously the staves laid out on the table toward the wheels 19 and 20. The belts are supported at the outer run end upon a pair of driving pulleys 34 secured on a shaft 35 having suitable bearing support on the underside of the table 5. At the inner ends of their runs the belts are supported upon a pair of free rollers 36 mounted on a pair of brackets 37 adjustably secured to the underside of the table 5 and positioning the rollers between the wheels 19 and 20. The pulley shaft 35 is driven by means of a sprocket 38 secured on the shaft and driven by a chain 39 extending over another sprocket 40 secured to a gear 41 rotatably mounted on a stub shaft 42 secured in the casing 24. Gear 41 is in driven mesh with a pinion 43 secured upon the shaft 23.

As the staves engage and are continuously carried forward by the wheels 19 and 20, they are held in position upon the wheels by a pair of endless V belts 44 and 45 bearing upon the outer surfaces of the staves and pressing them into close engagement with the wheels. V belt 44 is supported and guided by a series of driving grooved pulleys 46, 47 and 48, and a driven pulley 49. Belt 45 is similarly supported by another series of grooved pulleys 50, 51, 52 and 53. A group of three shafts 54, 55 and 56 are mounted in spaced radial relation to the wheels 19 and 20, each shaft carrying a pair of the grooved pulleys comprising one of each of the series 46 to 48 and 50 to 52. Each of the shafts 54 to 56 is supported in one of three series of conventional bearings 57, 58 and 59 adjustably secured, as by bolts and lock-nuts, upon the semi-circular upper end portions of the frame members 10, 11 and 12. The bearings 57 and 59 may be of resilient mounting type, as indicated at 60. The shaft bearings are radially adjusted in position upon the frame members to align the shafts equi-distant from the peripheries of the wheels 19 and 20 so that the grooved pulleys carried by the respective shafts and supporting the V belts 44 and 45 will maintain the latter in snug contact with the outer surfaces of staves carried by the wheels 19 and 20. The shafts 54 to 56 have secured upon their ends respectively the gears 61, 62 and 63 each in mesh with and driven by the gear 21 and in such ratio thereto as to effect the driven speed of the V belts 44 and 45 at the same rate as the movement of the staves by the wheels 19 and 20.

The grooved pulleys 49 and 53, supporting and driven by one run end of the endless belts 44 and 45, are secured upon the ends of a short shaft 64, having suitable bearings in a U bracket 65 pivotally mounted on the shaft 56. Secured centrally upon the shaft 64 is a rubber-tired roller 66 having greater diameter than the grooved pulleys supporting the V belts. The roller 66 bears by gravity upon the upper surfaces of the staves approaching the wheels 19 and 20, and because of its greater peripheral speed forces the staves into close lateral contact with each other as they are engaged by the wheels. It will be apparent from the foregoing description that the staves are assembled and maintained upon the wheels 19 and 20 in the same inter-relation as in a finished tub, and consequently in position for cutting the ends and the croze in true right angular relation to the medial line of each stave, so that no further trimming is necessary when the tub is assembled, and the croze groove is continuously alined.

The stave ends are trimmed and the croze is cut, during the passage of the staves between the wheels 19 and 20 and the belts 44 and 45. A pair of short shafts 67 and 68, having suitable bearings respectively in the frame members 10 and 12, and 11 and 13, carry at their inner ends a pair of circular saws 69 and 70, the cutting edges of which extend upward through the path of the passing staves. The saws 69 and 70 are spaced apart by the desired finished length of a stave. The shafts 67 and 68 are parallel to the shaft 18, and preferably in the same radial plane with shafts 18 and 55 whereby the staves are firmly backed during the sawing operation by the belt supporting pulleys 47 and 51 carried by shaft 55. Shaft 68 also carries a set of croze cutters 71 mounted on the saw head and positioned to engage the staves during the sawing operation to cut the tub bottom supporting groove. The shafts 67 and 68 are driven by a pair of belts 72 and 73 running over pulleys 74 and 75 secured upon the respective shafts, the belts being driven by pulleys 76 and 77 secured on the shaft 31.

After the sawing or trimming and croze cutting operation, the staves pass out from under the retaining belts 44 and 45, and fall upon any convenient receptacle or conveyor (not shown herein) suitable for handling the staves preparatory to further operations in the manufacture of tubs.

I claim as my invention:

1. Apparatus of the class described comprising in combination a main shaft, a pair of spaced wheels being of different diameters and mounted on said shaft, said wheels having resilient frictional peripheries adapted to support staves transversely positioned on the peripheral surfaces of said wheels and continuously passing thereover with the revolution of said wheels, conveying means for positioning staves on said wheels in serial abutting relation, a plurality of spaced auxiliary shafts arranged about and radially spaced from said wheels, each of said auxiliary shafts lying in a plane common with said main shaft, a pair of pulleys mounted on each of said auxiliary shafts and positioned radially outward from said wheels respectively, a pair of belts supported on said pulleys and operable thereby to contact the outer surfaces of said staves and continuously retain said staves upon said wheels through part of a revolution thereof, the said pulleys positioned outwardly of each of said wheels respectively having diameters whereby said belts are operable at speeds respectively similar to the different peripheral speeds of said wheels, driving means connecting said main and auxiliary shafts adapted to operate said wheels and said belts, and means for trimming and crozing said staves while passing between said wheels and said belts.

2. Apparatus of the class described comprising in combination, a main shaft, a pair of spaced wheels mounted on said shaft, said wheels being adapted to support staves transversely positioned in laterally abutting relation on the peripheral surfaces of said wheels, a conveyor for continuously moving a series of staves to said wheels, a plurality of spaced auxiliary shafts arranged about and radially spaced from said wheels, each of said auxiliary shafts being in a plane common with said main shaft and similarly spaced therefrom, a plurality of pulleys mounted on said auxiliary shafts adjacent said wheels, a bracket having pivotal support on one of said auxiliary shafts and extending over said conveyor, a shaft operatively mounted on said bracket, a roller secured on said last mentioned shaft and adapted to bear upon the staves moving upon said conveyor, a pair of pulleys on said roller shaft, a pair of belts supported on the pulleys mounted on said auxiliary and roller shafts, said belts being operable to engage and retain said staves on said wheels and to drive said roller shaft, said pulleys on said roller shaft having diameters effective to drive said roller at greater peripheral speed than said belts, driving means connecting said main and auxiliary shafts adapted to operate said wheels and said belts at similar peripheral speeds, and means for trimming and crozing said staves while passing between said wheels and said belts.

AXEL M. WALSTROM.